United States Patent
Gupta et al.

(10) Patent No.: US 7,496,109 B1
(45) Date of Patent: Feb. 24, 2009

(54) METHOD OF MAXIMIZING BANDWIDTH EFFICIENCY IN A PROTOCOL PROCESSOR

(75) Inventors: Jay K. Gupta, Sunnyvale, CA (US); Somnath Paul, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 916 days.

(21) Appl. No.: 10/777,286

(22) Filed: Feb. 11, 2004

Related U.S. Application Data

(60) Provisional application No. 60/447,173, filed on Feb. 12, 2003.

(51) Int. Cl.
*H04L 12/56* (2006.01)

(52) U.S. Cl. .................................. 370/413; 370/428

(58) Field of Classification Search .............. 370/417, 370/413, 372, 389.3, 400, 428, 389
See application file for complete search history.

(56) References Cited

U.S. PATENT DOCUMENTS

| | | | |
|---|---|---|---|
| 4,777,485 A * | 10/1988 | Costello ..................... | 345/572 |
| 4,965,794 A | 10/1990 | Smith | |
| 5,079,693 A | 1/1992 | Miller | |
| 5,182,651 A | 1/1993 | Kishi | |
| 5,327,570 A * | 7/1994 | Foster et al. .................. | 712/30 |
| 5,555,478 A * | 9/1996 | Zelikovitz et al. ............. | 398/66 |
| 5,731,770 A * | 3/1998 | Minoda ....................... | 341/61 |
| 5,761,417 A * | 6/1998 | Henley et al. ................ | 709/231 |
| 5,802,310 A * | 9/1998 | Rajaraman .................. | 709/234 |
| 6,047,001 A * | 4/2000 | Kuo et al. .................... | 370/428 |
| 6,286,074 B1 * | 9/2001 | Batchelor et al. ........... | 710/305 |
| 6,347,097 B1 | 2/2002 | Deng | |
| 6,584,584 B1 | 6/2003 | Smith | |
| 6,957,309 B1 | 10/2005 | Gupta et al. | |
| 2002/0120798 A1 * | 8/2002 | Modelski et al. ............ | 710/107 |
| 2002/0191617 A1 * | 12/2002 | Duplessis et al. ........... | 370/400 |
| 2003/0169626 A1 * | 9/2003 | Burk et al. ................... | 365/200 |

OTHER PUBLICATIONS

Michael Timothy Moore, Filling the WAN-communications-line card, EDN Magazine, Apr. 18, 2002, pp. 83-90.
Louis e. Frenzel, Programmable Framer Chip Improves OC-48 Efficiency, Electronic Design, Downloaded Apr. 16, 2001, 4 pages.

(Continued)

*Primary Examiner*—Kwang B. Yao
*Assistant Examiner*—Andrew Lai
(74) *Attorney, Agent, or Firm*—Blakely, Sokoloff, Taylor & Zafman LLP

(57) ABSTRACT

A packet processing system including an encapsulator engine, and a packet pre-processor coupled to the encapsulator engine. The packet pre-processor calculates a variation between an input data rate and a pre-determined output data rate. The input data rate is based on a number of data read requests. The packet pre-processor compensates for the variation by modifying the number of data read requests.

26 Claims, 6 Drawing Sheets

OTHER PUBLICATIONS

Nilam Ruparelia, Delivering Ethernet over Sonet using Virtual Concatenation, CommsDesign.com, http://www.commsdesign.com/story/OEG20020225S078, Feb. 25, 2002, 8 pages.

Nilam Ruparella, "Delivering Ethernet Over Sonet Using Virtual Concatenation", CommsDesign, Feb. 25, 2002, 8 pages, www.commsdesign.com/story/OEG20020225S0078.

Louis E. Frenzel, "Programmable Framer Chip Improves OC-48 Efficiency", Electronic Design, Apr. 16, 2001, 4 pages.

Michael Timothy Moore, "Filling the WAN-Communications-LineCard", designfeature, Apr. 18, 2002, 5 pages, www.ednmag.com.

* cited by examiner

US 7,496,109 B1

METHOD OF MAXIMIZING BANDWIDTH EFFICIENCY IN A PROTOCOL PROCESSOR

RELATED APPLICATION

This application claims the benefit of U.S. Provisional Application No. 60/447,173, filed Feb. 12, 2003.

TECHNICAL FIELD

Embodiments of the present invention pertain to the field of electronic circuitry and, more particularly, to communications systems and protocols.

BACKGROUND

The Internet may be described in a simplified manner as a collection of computer systems that are interconnected by networks (e.g., transmission lines, switches and routers) to enable the transfer of data among the computer systems. Data is typically transmitted in networks along a data path in the form of data packets. An important characteristic of a data path is bit width. Bit width is the number of bits manipulated or passed contemporaneously on the data path. The bit width of a data path determines its bandwidth along with clock speed. Bandwidth is a measure of how fast data flows on the data path. In digital systems, bandwidth may be expressed as data speed in bits per second (bps).

Other important parameters associated with a data path are the type of network and protocol used to transmit data on the data path. Computer systems communicate with each other using a variety of networks such an Internet Protocol (IP) network and a Synchronous Optical Network (SONET). SONET is the United States standard for synchronous data transmission on optical media. The international equivalent of SONET is synchronous digital hierarchy (SDH). Together, they ensure standards so that digital networks can interconnect internationally and that existing conventional transmission systems can take advantage of optical media.

FIG. 1 illustrates a conventional architecture of a line card, used in a network communication device that includes a link layer device and a framer. The link layer device typically includes components such as a network processor, a network co-processor, memory, datapath switching element (DSE), network search engine (NSE), and a clock management block. The network processor and/or a framer usually performs packet processing functions. Packet processing functions may involve tasks such as packet pre-classification or classification, protocol conversion, quality of service assurance, service policing, provisioning, and subscriber management functions. The framer is used to transport data such as ATM (asynchronous-transfer-mode) cells, IP packets, and newer protocols, such as GFP (generic framing procedure) over SONET (synchronous optical network)/SDH (synchronous packet processing system hierarchy) links. On the port side, the framer may support optical-networking protocols for both SONET/SDH and direct data-over-fiber networks. The framer is coupled to the physical layer port such as a SONET device, which is coupled to a network medium such as optics. On the system side, the framer interfaces to the link-layer device usually through standard buses, for example, the Universal Test and Operation Physical interface device for ATM (UTOPIA) or Packet Over SONET-physical layer (POS-PHY) buses.

BRIEF DESCRIPTION OF THE DRAWINGS

The present invention is illustrated by way of example, and not by way of limitation, in the figures of the accompanying drawings and in which.

DETAILED DESCRIPTION

Figure 1:
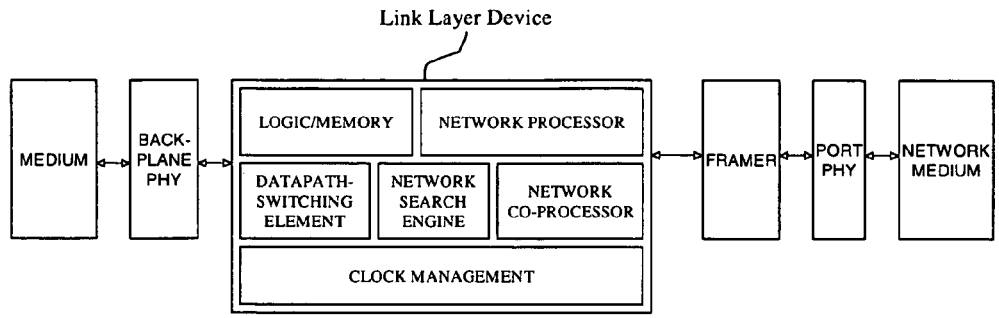
FIG. 1 illustrates a conventional architecture of a line card, used in a network communication device, that includes a link layer device and a framer.

In the following description, numerous specific details are set forth such as examples of specific components, devices, methods, etc., in order to provide a thorough understanding of the present invention. It will be apparent, however, to one skilled in the art that these specific details need not be employed to practice the present invention. In other instances, well-known materials or methods have not been described in detail in order to avoid unnecessarily obscuring the present invention. It should also be noted that the "lines" discussed herein that connect components may be single bit lines, multiple bit lines, or buses. The term "coupled" as used herein means coupled directly to, or indirectly through one or more intervening components. It should be noted that a "physical interface device" is also referred to as a "physical-layer device." It should be noted that at times the following discussion refers to bytes only for ease of illustration. In alternative embodiments, the operations may be performed on another bit group basis with a bit group including one or more bits of data.

A method is described for calculating a variation of an input data rate for a communication channel that is based on the number of data read requests which, in turn, is based on a pre-determined data output rate, and compensating for the variation by modifying the number of data read requests received from a physical interface device. Modifying the number of data read requests may increase the bandwidth in the communication channel. In one embodiment, the method may be used in multiple communication channels. The method may be implemented by a framer having a packet encapsulator.

In one embodiment, a framer includes a framer engine that generates read requests for data, and the data is fetched from the link layer device. The framer, which includes a packet encapsulator, acts on the data received from the link layer device, processes it, and delivers it to physical interface device. The physical interface device requests data at a predetermined rate from the framer and expects a pre-determined amount of data for every request. In one method, the data read request are generated by the framer engine and transferred to the link layer device to fetch data; or such a data read request may be masked if there is insufficient space in the output first-in-first-out (FIFO) that is read by the framer engine. In other words, an additional data read request is not generated and sent by the packet encapsulator to the link layer device in addition to any data read request sent from the physical interface device to the link layer device.

In another method, the packet encapsulator of a framer determines the variation between a pre-determined output data rate (which is based on the pre-determined output data bus width) expected by a physical interface device, and the input data rate sent from the link layer device to the packet encapsulator. The packet encapsulator after determining the variation between the pre-determined output and the input data rate compensates for the variation by modifying the number of data read requests sent to the link layer device. More specifically, in one embodiment, the pre-compute circuitry of the packet encapsulator computes the total bytes of data to be output by the packet encapsulator accounting for the data received from the link layer device, invalid bytes in the received data if any, and for any inserted data and/or deleted data within the packet encapsulator. The pre-compute circuitry sends the total bytes of data to a request modifier circuitry of the packet encapsulator. The request modifier circuitry determines the difference between the total bytes of data to be output by the packet encapsulator and the pre-determined output data bus width (e.g., bit width of the data path), and subtracts the difference from a counter value. The counter value may reflect the trend of the current variation in bandwidth (i.e., variation between the input data rate and the pre-determined output data rate) of the packet processing system. A positive counter value may indicate that the link layer device sent too little data for transmission to the physical interface device (e.g., SONET device), and additional data read requests may be generated by the request modifier circuitry to fetch more data from the link layer device to compensate for the deficit in bandwidth caused by the variation between the input and output data rates. A negative counter value may indicate that the link layer device sent too much data for transmission to the physical interface device (e.g., SONET device), and at least one or more data read requests may be masked by the request modifier circuitry to reduce the credit in the bandwidth caused by the variation in the input and output data rates (i.e., reduce the effective bandwidth to the desired bandwidth level of the physical interface device).

Figure 2:
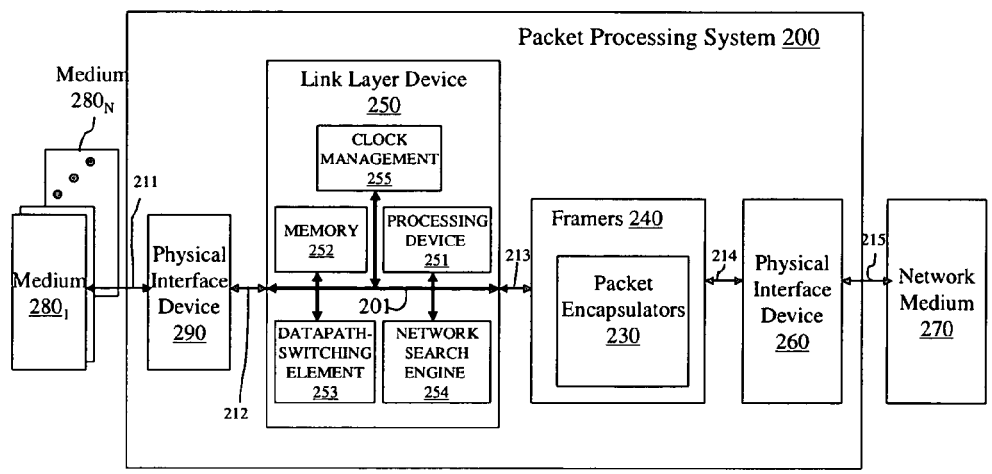
FIG. 2 illustrates one embodiment of a packet processing system.

FIG. 2 illustrates one embodiment of a packet processing system. Packet processing system 200 may be used in a communication system such as a computer, server, router, switch, server load balancer, add/drop multiplexer, digital cross connects, or other piece of communication equipment. In one embodiment, the packet processing system 200 may be implemented in a line card that links external network connections to each other. Some examples of line cards include a switch-fabric card, a time-division multiplexed data card, an Ethernet data card and an optical carrier (OC) data card. The communication system that hosts the line card may have, for example, a chassis and a backplane with many slots into which one or more line cards may be mounted. The line cards can be removed and inserted to change the number of ports or to support different communications protocols or physical interface devices. Alternatively, packet processing system 200 may be implemented in other cards or integrated into other system components.

Packet processing system 200 may be coupled to network medium 270 by line 215, and to one or more mediums $280_1$-$280_N$ by line 211. Medium $280_1$-$280_N$ may be similar or dissimilar mediums. In one embodiment, for example, medium 270 may be optics and medium $280_1$ may be copper and medium $280_N$ may be optics. Alternatively, other similar and dissimilar configurations of mediums and network mediums may be used. In one embodiment, N may represent the number of communication ports that are coupled to the packet processing system 200. In one embodiment, packet processing system 200 may include physical interface device 290, link layer device 250, framer 240 which includes packet encapsulator 230, and physical interface device 260. The link layer device 250 is coupled to the physical interface device 290 and framer 240. In an alternative embodiment, framer 240 may include multiple packet encapsulators. In an alternative embodiment, packet processing system 200 may include multiple physical interface devices 290. In one embodiment, the packet processing system 200 may be used as one communication channel from medium 280 to network medium 270. In an alternative embodiment, the packet processing system 200 may be implemented in multiple communication channels from multiple mediums to multiple network mediums. In one embodiment, the mediums and the network mediums may be copper. In alternative embodiments, similar and dissimilar mediums and network mediums may be used.

Link layer device 250 may include a processing device 251, memory 252, datapath switching element (DSE) 253, network search engine (NSE) 254, and/or a clock management block 255. The components of the link layer device 250 may be coupled to each other using one or more buses and/or lines as exemplified by bus 201. In one embodiment, for example, the components of link layer device 250 may be arranged and coupled in a look-aside configuration. In the look-aside configuration the processing device 251 of link layer device 250 may include a network processor and a network co-processor. In the look-aside configuration, the network co-processor resides beside the network processor outside the datapath (bus 201), enabling packet co-processing in parallel with the network processor operation, increasing the overall throughput. In another embodiment, the components of link layer device 250 may be arranged and coupled in a streaming configuration. In the streaming configuration, the datapath includes both the network processor and the network co-processor. Packets pass through the network co-processor, so it can act on packets as requested by the network processor and pass them directly to the network processor. Alternatively, the components of link layer device 250 may be arranged and coupled in other configurations known in the art.

In one embodiment, the processing device 251 may be a network processor. A network processor is a specialized microprocessor that supports the address sizes and common operations of networking equipment, and may perform some or all the packet processing functions. Typical network processors allow multiple processors to share the computational load of a high-speed data stream. The network processor may be used for processing information and/or controlling the movement of data packets to and from framer 240. In another embodiment, the processing device 251 may be a field programmable gate array (FPGA). Alternatively, the processing device 251 of link layer device 250 may represent one or more other processing devices such as a general-purpose processor (e.g., a Motorola PowerPC™ processor or an Intel® Pentium® processor), a special purpose processor (e.g., a digital signal processor (DSP)), and a controller. In an alternative embodiment, the processing device 251 of the link layer device 250 may not be used, and the processing functions may be performed in the framer 240.

The DSE 253 of link layer device 250 may be used to multiplex the data transmitted on bus 201. The NSE 254 of link layer device 250 may perform data route-table look-ups. In one embodiment, NSE 254 may be, for example, a content addressable memory (CAM) device. In an alternative embodiment, the operations of the NSE 254 may be performed by other devices, for example, a random access memory (RAM) with a hashing function performed in the processing device 251. The NSE 254 may also serve as a server-load balancer, which takes incoming traffic from the Internet and distributes the processing load among a number of servers. Memory 252 of link layer device 250 may include a random access memory (RAM), or other dynamic storage devices, for storing information (e.g., packets) and instructions to be executed by processing device 251 of link layer device 250. The memory 252 of link layer device 250 may be used for storing temporary variables or other intermediate information during execution of instructions by processing device 251. The memory 252 of link layer device 250 may also include a read only memory (ROM) and/or other static storage devices for storing static information and instructions for processing device 251 of link layer device 250. It should be noted that link layer device 250 may also include other components that have not been illustrated. It should be noted that the components of link layer device 250 have been shown with separate components. In an alternative embodiment, one or more of the components of link layer device 250 may be combined with other components into one or more integrated circuits.

In one embodiment, framer 240 may be coupled to physical interface device 260. In an alternative embodiment, framers 240 may reside external to packet processing system 200. Framer 240 may include network protocol related circuitry to encode and decode the data that is transmitted on network medium 270 for error detection and correction purposes, and a packet encapsulator 230 that operates to map arbitrary data streams to a regular data stream, as discussed in detail below.

Depending upon the particular design environment implementation, framer 240 may be coupled to a physical interface device 260. Physical interface device 260 may be, for example, a SONET device, an Ethernet card, a token ring card, or other types of physical interface devices for providing a communication link to network medium 270 to and from the framer 240. SONET devices and Ethernet cards are known in the art; accordingly, a detailed discussion is not provided.

It will be appreciated that the packet processing system 200 represents only one example of a packet processing system, which may have many different configurations and architectures. For example, some packet processing systems often have multiple buses, such as a peripheral bus, a dedicated cache bus, etc. As another example, packet processing system 200 may be a line card. In one embodiment, the line card may be used in a system-to-network interface. Alternatively, the line card may be implemented in an intermediate node in a network that provides a network-to-network interface, such as a wide area network (WAN). Such an intermediate node may provide an interface between similar networks or dissimilar networks.

In one exemplary embodiment, packet processing system 200 may be a line card in a WAN connecting a data stream from Ethernet to SONET. In this embodiment, the line card is coupled to an optic network medium (network medium 270) and a copper medium (medium 280) by lines 215 and 211, respectively. The copper medium may include multiple serial ports. The copper medium is coupled to an Ethernet device (physical interface device 290) of the line card by line 211. The Ethernet device acts as a serializer/deserializer (SERDES) and may be a backbone link between multiple line cards. The Ethernet device is coupled to the link layer device 250 by line 212. In such an exemplary embodiment, the link layer device 250 may utilize a FPGA device as processing device 251. In this exemplary embodiment, packet processing functions, such as encapsulating the data into a communication protocol, such as ATM, GFP, and HDLC, that may be performed in processing device 251, are performed by the framer 240. Packet encapsulator 230 of framer 240 performs data modifications to the packet and encapsulates the data into a communication protocol (described in detail below). The framer 240, acting as master device, receives isolated input data packets from the Ethernet device (physical interface device 290) and frames the data to be output as back-to-back framed data to the SONET device (physical interface device 260) on line 214 (described in detail below). The SONET device transmits the framed data over the optic medium (network medium 270) on line 215. In another embodiment, multiple packet processing systems may be implemented in multiple line cards, each line card including a framer and a SONET device coupled to a network medium, and the line cards may be coupled to each other through a backbone physical interface. In an alternative embodiment, the operations discussed below in the context of framer 240 may be performed in other devices, such as, for example, a network processor, co-processor, encapsulator, or switch.

Figure 3:
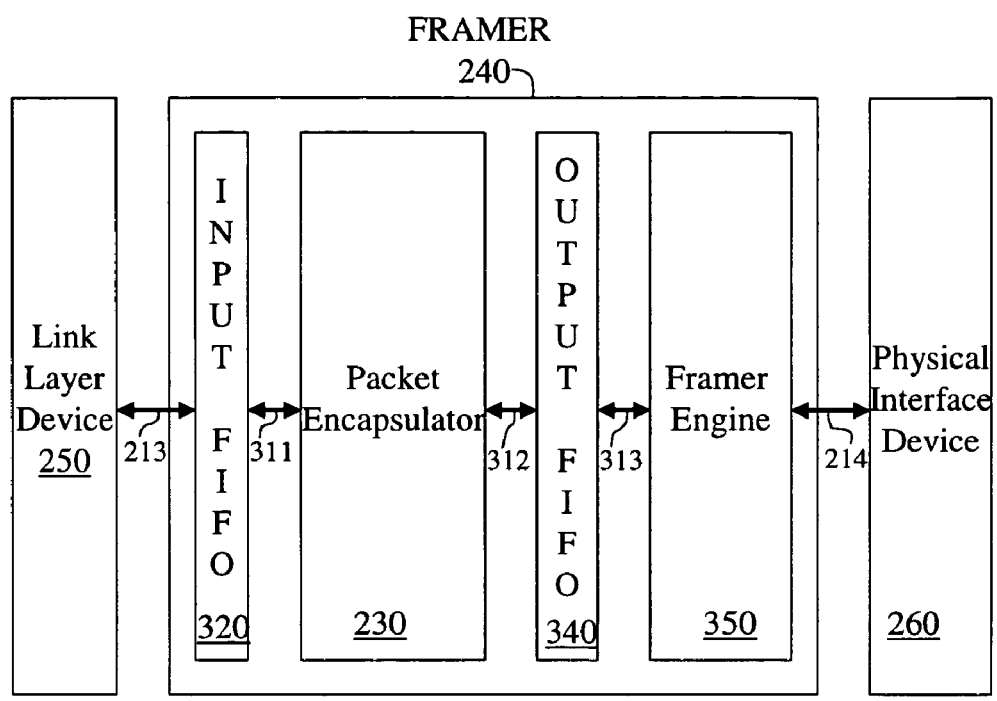
FIG. 3 illustrates one embodiment of framer including a packet encapsulator.

FIG. 3 illustrates one embodiment of a framer 240 including a packet encapsulator 230. Data, in the form of packets, may be transmitted along a data path from a link layer device 250 to a framer 240 on line 213, and from the framer 240 to a physical interface device 260 on line 214. The data path may be the structural portion of the framer 240, which under the influence of control, manipulates and passes data from a one side to the other (e.g., from link layer device 250 to physical interface device 260). Framer 240 formats the data into a packet protocol structure that may be conducive to transmission on physical interface device 260. The packet protocol specifies the arrangement of information within the packet.

In one embodiment, framer 240 may include packet encapsulator 230, an input first-in-first-out (FIFO) 320, an output FIFO 340, and a framer engine 350. Packet encapsulator 230 is coupled to an input FIFO 320 and an output FIFO 340 by lines 311 and 312, respectively. Framer engine 350 is coupled to the output FIFO 340 by line 313 and to physical interface device 260 by line 214. Data may be received by input FIFO 320 from link layer device 250 on line 213. Data arriving faster than the throughput capacity of framer 240 may result in a dropped transmission. Input FIFO 320 operates to buffer the input data stream received from link layer device 250 in order to handle overloads of packets in the input data stream. Similarly, output FIFO 340 operates to buffer the output data stream transmitted to/from physical interface device 260 on line 214. The physical interface device 260 may output to a network medium 270. Network medium 270 may be copper or optics or other network mediums known in the art. In alternative embodiments, buffering may be accomplished by other means, for example, using a RAM or a FIFO coupled to framer 240 or memory 252 of link layer device 250.

Data may be transmitted from input FIFO 320 to packet encapsulator 230 on line 311. The output data stream packets may be output from packet encapsulator 230 on line 312 to output FIFO 340. The output FIFO 340 operates to buffer the output data stream packets received from packet encapsulator 230 on line 312. Output FIFO 340 may also transmit data and control signals generated by the framer engine 350 to be sent to the packet encapsulator 230 on line 312. Framer engine 350 operates to receive packets from the output FIFO 340 on line 313. Framer engine 350 operates to align the input data stream packets into frames to be transmitted to the physical interface device 260 on line 214. Framer engine 350 frames the packets according to a framing specification. The framing specification may be a specification of the "protocol bits" that surround the "data bits" to allow the data to be "framed" into segments. The framing specification allows a receiver to synchronize at points along the output data stream. It should be noted that framer 240 may include other components such as a packet error checker (not shown). Packet error checking is known in the art; accordingly, a detailed discussion is not provided. It should be noted that the framer 240 has been shown with separate components. In an alternative embodiment, one or more of the components of framer 240 may be combined with other components into one or more integrated circuits.

Figure 4A:
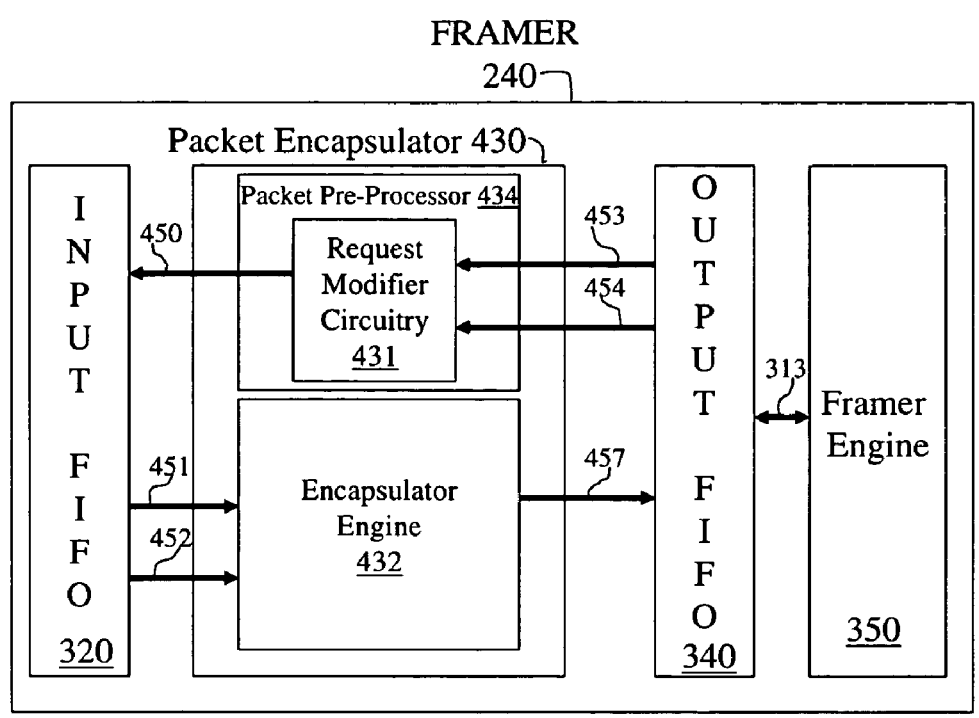
FIG. 4A illustrates one embodiment of packet encapsulator of a framer.

FIG. 4A illustrates one embodiment of a packet encapsulator of the framer 240. It should be noted that packet encapsulator 430 may be used in all configurations described in relation to packet encapsulator 230. In this embodiment, packet encapsulator 430 includes packet pre-processor 434 and encapsulator engine 432. The packet pre-processor 434 of packet encapsulator 430 includes a request modifier circuitry 431. Packet pre-processor 434 (request modifier circuitry 431) is coupled to the input FIFO 320 by line 450, and to output FIFO 340 by lines 453 and 454. Encapsulator engine 432 of packet encapsulator 430 is coupled to the input FIFO 320 by lines 451 and 452, and to output FIFO 340 by line 457. Output FIFO 340 is coupled to the framer engine 350 by line 313. The framer engine 350 may be coupled to the physical interface device 260. Input FIFO 320 may be coupled to link layer device 250. It should be noted that in this embodiment the encapsulator engine 432 and the packet pre-processor 434, which includes the request modifier circuitry 431, are shown as separate blocks for ease of discussion. In an alternative embodiment, block components may be combined into one or more integrated circuits.

Figure 4B:
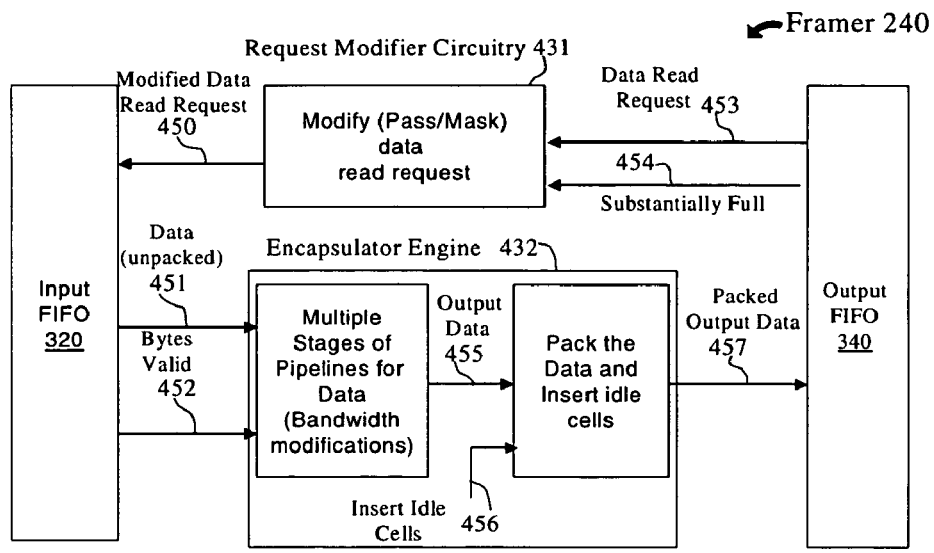
FIG. 4B illustrates functionality of the components of the packet encapsulator of FIG. 4A.

FIG. 4B illustrates functionality of the components of the packet encapsulator 430 described in relation to FIG. 4A. In the embodiment illustrated in FIG. 4A, the framer engine 350 generates data read requests to be transmitted to the link layer device 250 in order to fetch data for transmission. The request modifier circuitry 431 of the packet pre-processor 434 receives the data read requests from the framer engine 350 on line 453. The request modifier circuitry 431 sends a modified data read request on line 450 to the input FIFO 320 to fetch data from the link layer device 250. The link layer device 250 may fetch data from memory 252 of link layer device 250 or directly from multiple ports that may be coupled to link layer device 250 through a physical interface device 290 (e.g., Ethernet).

The modified data read request sent to the input FIFO 320 by the request modifier circuitry 431 of packet pre-processor 434 on line 450 may be the data read request received on line 453. Alternatively, the request modifier circuitry 431 of packet pre-processor 434 may mask the data read request received from the output FIFO 340 on line 453, meaning no modified data read request is transmitted to the input FIFO 320 on line 450. The request modifier circuitry 431 of packet pre-processor 434 may mask the data read request received on line 453 when there is insufficient space in the output FIFO 340 (described below). In one embodiment, masking the data read request may be implemented by not sending a modified data read request on line 450 to the link layer device 250. In another embodiment, masking the data read request may be implemented by sending a zero/one on the signal line 450 to the link layer device 250. Alternatively, other methods known in the art may be used to mask the data read requests.

When the link layer device 250 receives a data read request on line 450, the link layer device 250 fetches unpacked data and transmits the unpacked data to the input FIFO 320. The data is transmitted from the input FIFO 320 to the encapsulator engine 432 of the packet encapsulator 430 on line 451. Encapsulator engine 432 processes the unpacked data in multiple stages of pipelines for data bandwidth modifications. The bandwidth modification may include packing the input data packets into a back-to-back output data packet configuration and/or inserting idle cells. In another embodiment, the bandwidth modifications may include adding or deleting bytes at the header and/or trailer of the packet. Alternatively, other bandwidth modifications known in the art may be performed by the encapsulator engine 432. The encapsulator engine 432, after the multiple stages of pipelines, sends the data on line 455. The data sent on line 455 may be packed with any idle cells inserted on line 456. Idle cells or frames may be inserted on line 456 when the amount of unpacked data received from the link layer device 250 on line 213 is less than the amount of output data expected by the framer engine 350. The encapsulator engine 432 may output the packed data on line 457 to the output FIFO 340. The output FIFO 340 outputs the data to the framer engine 350 on line 313. The framer engine 350 frames the data and transmits the framed data to the physical interface device 260 (e.g., SONET device) on line 214. The physical interface device 260 transmits the framed data over the network medium 270. In one embodiment, the physical interface device 260 may be a SONET device. In another embodiment, other physical interface devices may be used, such as SDH or Ethernet. Alternatively, other physical interface devices known in the art may be used.

Following all protocol processing, described above, the packed output data sent on line 457 may be stored into the output FIFO 340. When the output FIFO 340 becomes substantially full, the output FIFO 340 may also transmit a substantially full signal on line 454 to the request modifier circuitry 431 of packet encapsulator 430 and may disable the data read request generation by request modifier circuitry 431 as long as the output FIFO 340 remains in the substantially full region. It should be noted that the multiple stages of pipelines used in the encapsulator engine 432 may contain data even after no more data read requests have been generated and sent to the link layer device 250. In order to prevent overflow in the output FIFO 340 from data that may be contained in the multiple stages of pipelines, the output FIFO 340 transmits a substantially full signal on line 454. The level at which the substantially full signal is triggered may be a set value and may depend on how many stages are used to perform the data modifications in the packet encapsulator 430. In one exemplary embodiment, the encapsulator engine 432 may comprise M number of stages of pipelines that the data passes through in response to a read request before it reaches the output FIFO 340. The output FIFO 340 in this embodiment has a storage capacity of K. In this exemplary embodiment, the output FIFO 340 is substantially full when the output FIFO 340 is filled to the storage capacity K minus M, the number of stages of the pipeline. When the output FIFO 340 is substantially full, a substantially full signal may be sent to indicate that the output FIFO 340 is substantially full and may allow data contained in the M stages of pipelines to be written into the output FIFO 340 without being dropped in the output FIFO due to overflow. The request modifier circuitry 431 may use the substantially full signal sent on line 454 to determine whether to pass the data read request sent by the output FIFO 340 on line 453 as the modified data read request on line 450 or mask the data read request sent on line 453 (e.g., not transmit the modified data read request on line 450).

In another embodiment, the input FIFO 320 may send the bytes valid signal on line 452 to packet encapsulator 430 to indicate which bytes are valid data in the input data stream sent on line 451. The packet encapsulator 430 may use the bytes valid signal sent on line 452 to determine how many idle cells may need to be inserted on line 456 with the output data stream sent on line 455 to be packed in the encapsulator engine 432. The packed output data stream may be transmitted to the output FIFO 340 on line 457.

Figure 5:
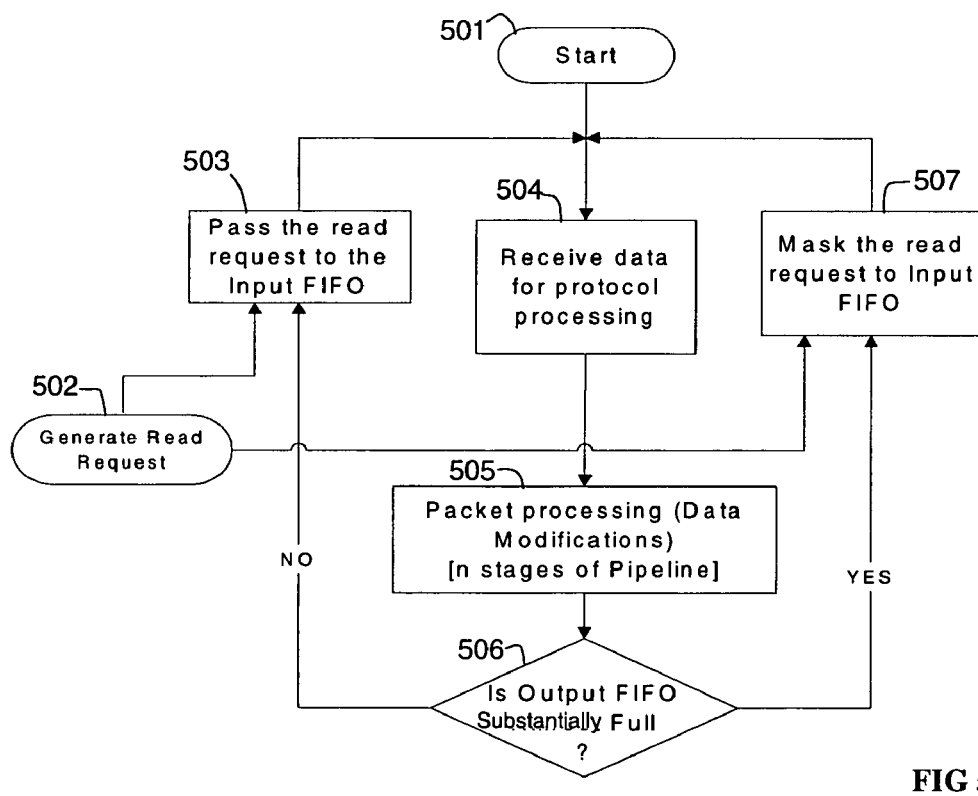
FIG. 5 illustrates an embodiment of a method for packet processing.

FIG. 5 illustrates one embodiment of a method for packet processing. The framer 240 may be initialized and ready to receive data from the link layer device 250, step 501. Data read request sent on line 453 is generated by the framer engine 350 and sent to the request modifier circuitry 431, step 502. The data read request may be passed to the input FIFO 320 as modified data read request 450 by the request modifier circuitry 431, step 503. Data is sent on line 213 from the link layer device 250 to the input FIFO 320 for protocol processing, step 504. Data modifications are made in the encapsulator engine 432, step 505. Data modifications made during this step may include but are not limited to processing the data in multiple stages of a pipeline, packing the data, inserting idle cells, and adding or deleting bytes at the header and/or trailer of the packet. Request modifier circuitry 431 determines if the output FIFO 340 is substantially full by the substantially full signal sent by the output FIFO 340 to the request modifier circuitry 431 on line 454, step 506. If the output FIFO 340 is substantially full then at least one or more of the data read request received on line 453 by the request modifier circuitry 431 may be masked, meaning the request modifier circuitry does not send a modified data read request on line 450 to the input FIFO 320, step 507. The method may continue to mask the data read requests received on line 453 by the request modifier circuitry 431 as long as the output FIFO 340 is substantially full. If the output FIFO 340 is not substantially full then the data read request sent on line 453 may be passed to the input FIFO 320 as modified data read request 450 by the request modifier circuitry 431, step 503. The method may continue to pass the data read requests received on line 453 by the request modifier circuitry 431 as long as the output FIFO 340 is not substantially full.

In the embodiments described in relation to FIG. 5, the framer engine 350 acts as the master device during the packet processing operation. It requests data at a pre-determined rate and expects a pre-determined amount of data for every request. The packets sent from the link layer device 250 to the packet encapsulator 430 may not be packed and may be aligned to one side of the data bus. In one embodiment, input data may be aligned to a Most Significant Bit (MSB) of an input data bus. In this embodiment, a Start of Packet (SOP) marker in the packet is aligned to the MSB. In an alternate embodiment, the SOP marker could be aligned to a Least Significant Bit (LSB) of the input data bus. Alternatively, the data may be aligned using alternative methods known in the art.

If the packet size is not a multiple of a pre-determined output data bus width (e.g., bit width of the data path), the cycle where an End of Packet (EOP) marker is transferred may contain some invalid data bytes in the input data. In the method described above, these invalid bytes in the input data stream may accumulate and may cause some idle cell insertions when the output FIFO 340 level goes below a substantially empty level. For example, idle cells may be inserted after the end of packet (EOP) marker if the next packet is not completely received by the output FIFO 340. Such a condition may be considered substantially empty. Alternatively, the output FIFO 340 may be considered substantially empty when the output FIFO 340 has a partial packet whose end is not known. In another embodiment, the amount of idle cell insertions may also be associated with the fill level of the output FIFO 340. For example, the idle cell insertions may be inserted when there is a partial packet and when the output FIFO 340 is at a predetermined fill level, for example, a sixteenth full, an eighth full, or a quarter full. These idle cell insertions may cause the bandwidth to be underutilized even though the link layer device 250 may have the capacity to provide more data to the physical interface device 260 to be transmitted on network medium 270.

This solution may have some undesirable characteristics. If there are one or more invalid bytes in the input data stream from the link layer device 250 to the framer 240 or if any bytes are deleted from the packet by the link layer device 250 (such as by the processing device 251 of link layer device 250), the encapsulator engine 432 may insert more idle cells into the output data stream, even though the input FIFO 320 has enough data to utilize more of the bandwidth. This may cause the utilization efficiency of the bandwidth of the packet processing system 200 to be reduced.

In one exemplary embodiment, the pre-determined output data bus width is 16-bytes and the packets being transferred are 24-bytes wide and back-to-back. In this embodiment, there is no insertion or deletion of data in the data packet by the link layer device 250. The link layer device 250 transfers these packets to the physical interface device 260 through the framer 240. In the first cycle, there are 16-bytes of data and in the second cycle there are 8-bytes of data. Since the physical interface device 260 expects 16-bytes of data for every data read request generated by framer engine 350 and sent on line 453, there may be an average deficit of 8-bytes every 32-bytes of expected data (or 8-bytes of deficit every 24-bytes of actual data) inserting an average of 8-bytes of idle cells per 24-byte packet. In this exemplary embodiment, the utilization efficiency of the bandwidth of the packet processing system 200 in this case is 75% (i.e., 24/32-bytes).

Figure 6A:
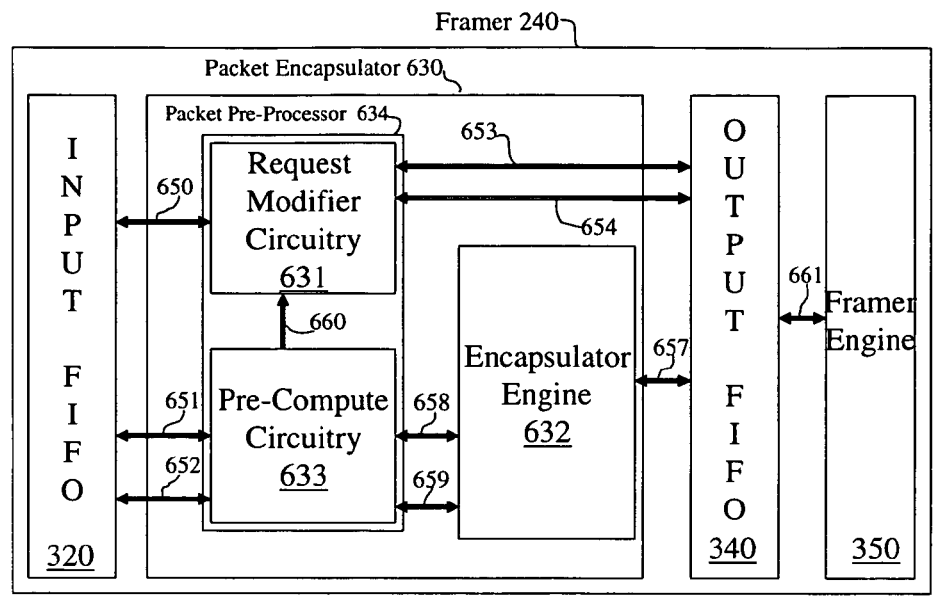
FIG. 6A illustrates another embodiment of packet encapsulator of a framer.

FIG. 6A illustrates another embodiment of a packet encapsulator of framer 240. It should be noted that packet encapsulator 630 may be used in all configurations described in relation to packet encapsulator 230. The packet encapsulator 630 may be configured to modify data read requests sent from the framer engine 350. Packet encapsulator 630 includes a packet pre-processor 634, and an encapsulator engine 632. Packet pre-processor 634 may include a request modifier circuitry 631, and pre-compute circuitry 633. Request modifier circuitry 631 of packet pre-processor 634 is coupled to the input FIFO 320 by line 650, and to output FIFO 340 by lines 653 and 654. Pre-compute circuitry 633 of packet pre-processor 634 is coupled to the input FIFO 320 by lines 651 and 652, and to the encapsulator engine 632 by lines 658 and 659. The request modifier circuitry 631 and pre-compute circuitry 633 are coupled by line 660. The encapsulator engine 632 is coupled to the output FIFO 340 by line 657. Output FIFO 340 is coupled to the framer engine 350 by line 661. The framer engine 350 may be coupled to the physical interface device 260 by line 214. Input FIFO 320 may be coupled to link layer device 250 by line 213. It should be noted that in this embodiment the request modifier circuitry 631 and the pre-compute circuitry 633 are combined into one component as the packet pre-processor 634. Further, in this embodiment, packet pre-processor 634, and encapsulator engine 632 are shown as separate components. In another embodiment, packet pre-processor 634, and encapsulator engine 632 may be combined in one component. Alternatively, the separate components of packet encapsulator 630 may be combined into one or more integrated circuits. For ease of discussion, the components of packet pre-processor 634 will be discussed as separate components, request modifier circuitry 631 and pre-compute circuitry 633.

Figure 6B:
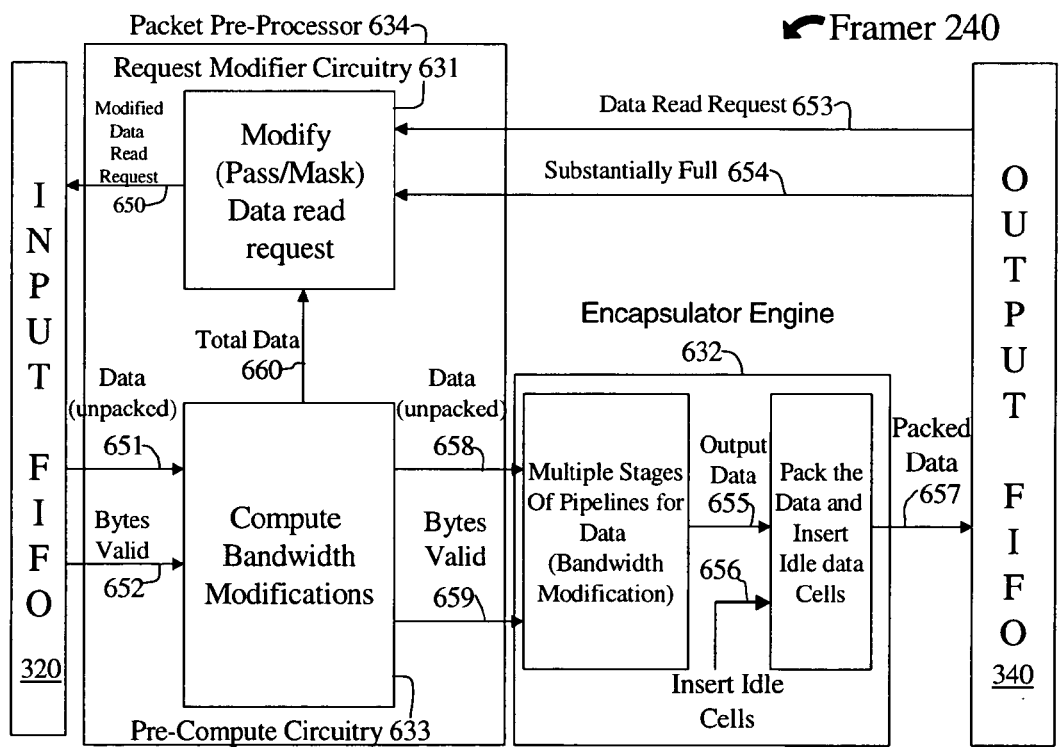
FIG. 6B illustrates functionality of the components of the packet encapsulator of FIG. 6A.

FIG. 6B illustrates functionality of the packet encapsulator 630 illustrated in FIG. 6A. In this embodiment, the physical interface device 260 may be a SONET device. Alternatively, other physical interface devices known in the art may be used. The framer engine 350 generates data read requests and sends the data read requests to the link layer device 250. The request modifier circuitry 631 of packet pre-processor 634 receives the data read requests generated by the framer engine 350 on line 653. The request modifier circuitry 631 sends the data read requests to the input FIFO 320 by line 650. The input FIFO 320 may send the input data read request to the link layer device 250 by line 213. The link layer device 250 upon receiving the data read request may fetch data from the memory 252 of link layer device 250. Alternatively, the link layer device 250 may fetch data directly from multiple ports of the physical interface 290. The data that is fetched by the link layer device 250 may be stored in the input FIFO 320 and transmitted to the pre-compute circuitry 633 on line 651.

The request modifier circuitry 631 receives a data read request on line 653 from the output FIFO 340 (generated by the framer engine 350). The framer engine 350 may be configured to generate data read requests at a pre-determined output data rate, and to receive a pre-determined amount of output data for every data read request generated. The request modifier circuitry 631 sends a modified data read request on line 650 to the input FIFO 320 to fetch data from the link layer device 250. The modified data read requests sent on line 650 may be stored and/or buffered in the input FIFO 320. The request modifier circuitry 631 may pass the data read request received on line 653 as a modified data read request on line 650, meaning the modified data read request may be the same as the data read request sent on line 653 (i.e., pass the data read request). Alternatively, the request modifier circuitry 631 may mask at least one or more of the data read requests sent from the framer engine 350 on line 653, meaning no modified data read request is transmitted on line 650 to the input FIFO 320. The request modifier circuitry 631 may mask at least one or more of the data read requests sent on line 653 when there is insufficient space in the output FIFO 340 (described below). The request modifier circuitry 631 may also generate additional data read requests to be sent to the input FIFO 320 on line 650 to fetch additional data to compensate for a deficit in the bandwidth caused by the variation between the input and output data rates. It should be noted that the additional data read requests may be sent in between the data read requests that are sent at the pre-determined output data rate.

The pre-compute circuitry 633 of the packet pre-processor 634 may be configured to receive data from the input FIFO 320 on line 651 (sent from the link layer device 250). This data may be unpacked. The pre-compute circuitry 633 may also receive a bytes valid signal on line 652 indicating which bytes are valid of the unpacked data transmitted on line 651. The pre-compute circuitry 633 may be configured to calculate and transmit the total bytes of data every clock cycle to the request modifier circuitry 631 on line 660. Certain bytes may be added or deleted from the packet before transmission to the framer engine 350. In addition, the data received from the link layer device 250 may have some invalid bytes associated with the EOP marker. The pre-compute circuitry 633 calculates the effective number of bytes transmitted to the next stage every clock cycle. The request modifier circuitry 631 may use the total bytes of data to determine if the data read requests received on line 653 should be passed to the input FIFO 320 or modified (described above). The total bytes of data is representative of the total amount of data received by the packet encapsulator 630 from the link layer device 250. The total bytes of data may account for any insertions or deletions made by the packet processing system 200.

In one embodiment, the total bytes of data being generated by the link layer device 250 is calculated by the pre-compute circuitry 633 and transmitted to the read request circuitry 631 on line 660. The read request circuitry 631 uses the total bytes of data to update a counter value in the request modifier circuitry 631. By updating the counter, request modifier circuitry 631 calculates a variation between an input data rate and a pre-determined output data rate. The input data rate is based on the total bytes of data received by the pre-compute circuitry 633 as a result of the number of data read requests that are generated by the framer engine 350. The pre-determined output data rate is based on the pre-determined output data bus width. After the request modifier circuitry 631 has calculated the variation between the input data rate and the pre-determined output data rate, the request modifier circuitry 631 compensates for the variation by modifying the number of data read requests sent to the link layer device 250. The counter value may reflect the current variation in bandwidth (i.e., variation between the input data rate and the pre-determined output data rate) of the packet processing system 200. When the counter value of request modifier circuitry 631 becomes more than an upper threshold value (e.g., the positive value of the pre-determined output data bus width), which may indicate that too little data is being sent to the physical interface device 260 from the link layer device 250, the request modifier circuitry 631 may generate at least one additional data read request and send the additional data read request to the link layer device 250 to fetch additional data by way of the input FIFO 320 on line 650. The additional data read requests may be generated by the request modifier circuitry 631 during the idle cycles, or in other words, between the data read requests that are generated by the framer engine 350 at a pre-determined output data rate. If the counter value becomes less than a lower threshold value (e.g., negative value of the pre-determined output data bus width), which may indicate that too much data is being sent to the physical interface device. 260, the request modifier circuitry 631 may mask at least one or more of the data read requests received on line 653 from the output FIFO 340.

The encapsulator engine 632 of the packet encapsulator 630 may be configured to receive unpacked data from the pre-compute circuitry 633 on line 658. The encapsulator engine 632 may also receive the bytes valid signal on line 659. The bytes valid signal may indicate which bytes are valid of the unpacked data transmitted on line 658. The encapsulator engine 632 may be configured to process the unpacked data received on line 651 in multiple stages of pipelines to perform the data bandwidth modifications. The data output from the multiple stages of pipeline may be sent on line 655 to be packed. Idle data cells may also be inserted on line 656 with the packed data on line 655. When the amount of unpacked data received from the link layer device 250 on line 651 is less than the amount expected at the pre-determined output data rate by the framer engine 350, idle cells may be inserted on line 656. The encapsulator engine 632 may output the packed data on line 657 to be stored in the output FIFO 340. The output FIFO 340 may transmit the data to the framer engine 350 on line 313. The framer engine 350 frames the packed data and sends the framed data to the physical interface device 260 on line 214. In one embodiment, the physical interface device 260 may be a SONET device. In alternative embodiments, other physical interface devices may be used, such as SDH and/or Ethernet, or other physical interface devices known in the art.

Following all protocol processing, described above, the packed output data stream sent on line 657 from the encapsulator engine 632 may be stored into the output FIFO 340. When the output FIFO 340 becomes substantially full, the output FIFO 340 may transmit a substantially full signal on line 654 to the request modifier circuitry 631 and may disable the data read request generation by the request modifier circuitry 631, as long as the output FIFO 340 remains in the substantially full region. It should be noted that the multiple stages of pipelines used in the encapsulator engine 432 may contain data even after no more data read requests have been sent to the link layer device 250. In order to prevent overflow in the output FIFO 340 from data that may be contained in the multiple stages of pipelines, the output FIFO 340 transmits a substantially full signal on line 454. The level at which the substantially full signal is triggered may be a set value and may depend on how many stages are used to perform the data modifications in the packet encapsulator 630. In one exemplary embodiment, the encapsulator engine 632 may comprise M number of stages of pipelines that the data passes through in response to a read request before it reaches the output FIFO 340. The output FIFO 340 in this embodiment has a storage capacity of K. In this exemplary embodiment, the output FIFO 340 is substantially full when the output FIFO 340 is filled to the storage capacity K minus M, the number of stages of the pipeline. When the output FIFO 340 is substantially full, a substantially full signal may be sent to indicate that the output FIFO 340 is substantially full and may allow data contained in the M stages of pipelines to be written into the output FIFO 340 without being dropped in the output FIFO due to overflow. The request modifier circuitry 631 may use the substantially full signal sent on line 654 to determine whether the request modifier circuitry 631 should pass the data read request received on line 653 as the modified data read request on line 650 or mask at least one or more of the data read request sent on line 653 (e.g., not transmit the modified data read request on line 650).

Alternatively, in another embodiment, the input FIFO 320 may send the bytes valid signal on line 652 to packet encapsulator 630 to indicate which bytes of the data sent on line 651 are valid. The packet encapsulator 630 may use the bytes valid signal to determine how many idle cells may need to be inserted on line 656 with the output data stream sent on line 655 to be packed in the encapsulator engine 632. The packed output data stream may be transmitted from encapsulator engine 632 to the output FIFO 340 on line 657. Alternatively, the bytes valid signal may be used by the pre-compute circuitry 633 to calculate the total bytes of data transmitted on line 660 to be used by the request modifier circuitry 631 in determining if the data read request should be passed or modified (e.g., mask at least one or more of the data read request or generate an additional data read request in addition to the data read requests generated by the framer engine 350).

In another embodiment, the framer 240 may be used in a packet processing system 200 where the link layer device 250 has more bandwidth than the pre-determined bandwidth expected by the framer engine 350, where the framer engine 350 is the master for all request generation actions, and where the link layer device 250 and the packet encapsulator 630 act as slaves to such requests.

Figure 7:
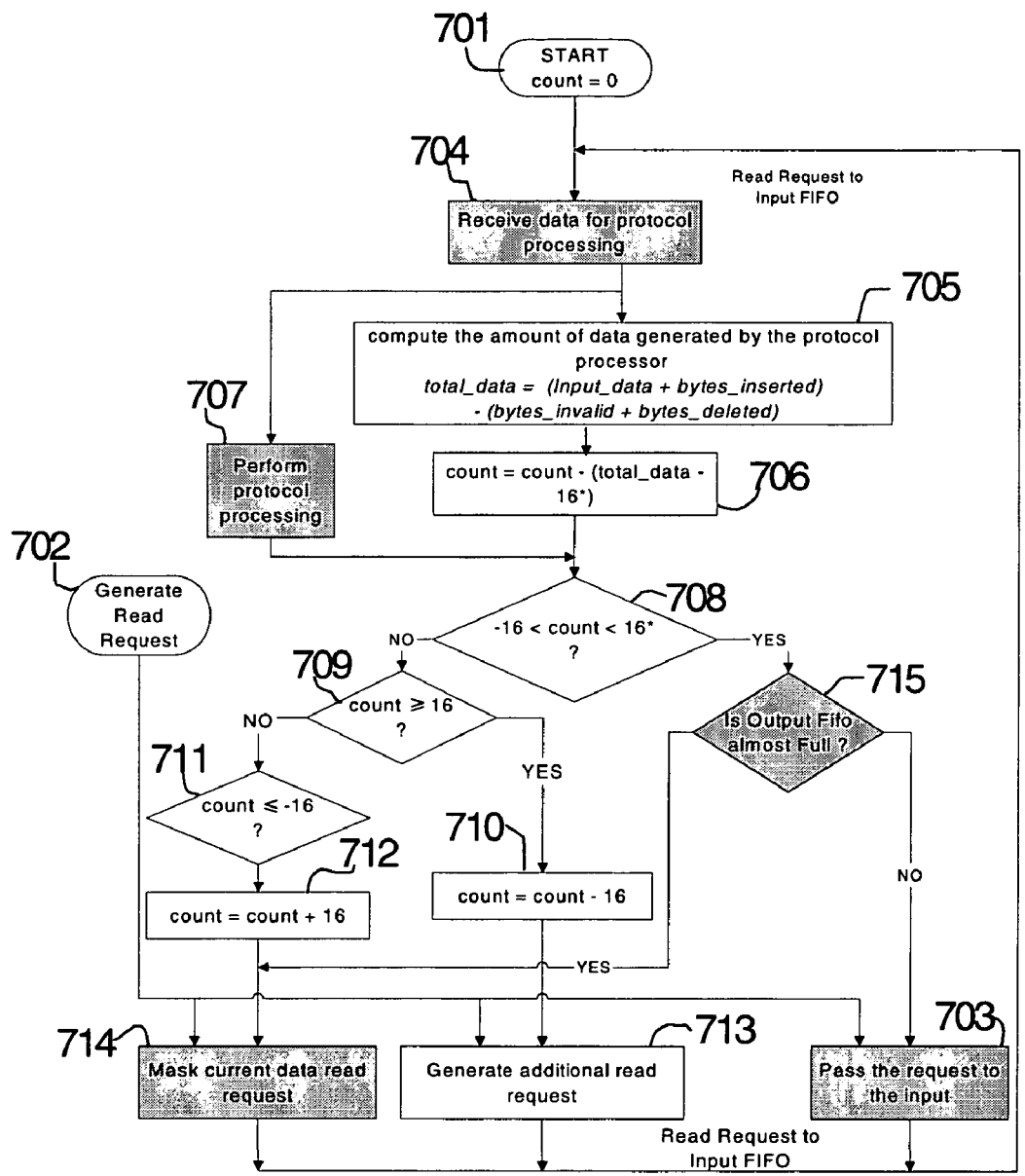
FIG. 7 illustrates another embodiment of a method for packet processing.

FIG. 7 illustrates another embodiment of a method for packet processing. This method calculates a variation between an input data rate and a pre-determined output data rate. The input data rate may be based on a number of data read requests. The method compensates for the variation by modifying the number of data read requests. In this embodiment, the framer 240 may be initialized and ready to receive data from the link layer device 250 on line 213, and the counter value (count) may be set to zero, step 701. A data read request is generated by the framer engine 350 and transmitted to the request modifier circuitry 631 on line 653, step 702. The data read request may be passed to the input FIFO 320 by request modifier circuitry 631 on line 650, step 703. The data read request may be read by the link layer device 250. In response to a data read request received by the link layer device 250, the link layer device 250 may fetch unpacked data and send it the pre-compute circuitry 633 on line 651 for protocol processing, step 704. The link layer device 250 may fetch the data from memory 252. Alternatively, the link layer device 250 may fetch data directly from multiple ports of the physical interface device 290. Pre-compute circuitry 633 calculates the amount of data, total bytes of data, received from the link layer device 250 on line 652 from the input FIFO 320, step 705. The link layer device 250 (e.g., processing device 251 of link layer device 250) may insert additional data or delete data from the input data packets that are transmitted from the link layer device 250 to the physical interface device 260. After calculating the total bytes of data, the pre-compute circuitry 633 may transmit the total bytes of data to the request modifier circuitry 631 on line 660. The request modifier circuitry 631 determines the variation between the input data rate and the pre-determined output data rate. The input data rate is based on the number of data read requests generated by the framer engine 350, and the pre-determined output data rate is based on the pre-determined output data bus width of the physical interface device 260. The framer engine 350 requests data at a pre-determined output data rate and expects a pre-determined amount of data for every data read request. The variation in bandwidth of packet processing system 200 may be calculated using the total bytes of data received and calculated by pre-compute circuitry 633, and the pre-determined output data bus width expected by the framer engine 350. The request modifier circuitry 631 uses the total bytes of data sent on line 660 to update a counter value, step 706. The current counter value may be updated by subtracting the difference between the total bytes of data and the pre-determined output data bus width from the previous counter value. In alternative embodiments, other methods of updating a counter value may be used.

The counter value may reflect the trend of the current variation in bandwidth (i.e., variation between the input data rate and the pre-determined output data rate) of the packet processing system 200. A positive counter value may indicate that too little data was sent from the link layer device 250, and additional data read requests may be generated by the request modifier circuitry 631 to fetch more data from the link layer device 250 to compensate for the deficit of bandwidth caused by the variation between the input and output data rates. A negative counter value may indicate that too much data was sent from the link layer device 250, and at least one or more data read requests may be masked to reduce the credit of bandwidth caused by the variation in the input and output data rates (i.e., reduce the effective bandwidth to the desired bandwidth level). In another embodiment, the positive and negative conventions may be reversed.

Data modifications may be made in the encapsulator engine 632, step 707. Data modifications made during this step may include but are not limited to processing the data in multiple stages of a pipeline, packing the data, inserting idle cells, and adding or deleting bytes at the header and/or trailer of the packet. Request modifier circuitry 631 determines if the counter value is between two threshold values, the positive value of the pre-determined output data bus width and the negative value of the pre-determined output data bus width, step 708.

If the counter value is between the two threshold values then the request modifier circuitry 631 determines if the output FIFO 340 is substantially full by the substantially full signal sent on line 654 from output FIFO 340, step 715. If in step 715 the output FIFO 340 is substantially full then at least one or more of the data read request sent on line 653 may be masked, meaning the modifier request circuitry 631 may not send the modified data read request to the input FIFO 320 on line 650, step 714. The method may continue to mask the data read requests sent on line 653 as long as the output FIFO 340 is substantially full. If the output FIFO 340 is not substantially full then the data read requests sent on line 653 may be passed to the input FIFO 320 on line 650 as a modified data read request, step 703.

If the counter value is not in between the two threshold values the request modifier circuitry 631 determines if the counter value is equal to and/or greater than the positive value of the pre-determined output data bus width, step 709. If the counter value is equal to and/or greater than the positive value of the pre-determined output data bus width the request modifier circuitry 631 subtracts the positive value of the pre-determined output data bus width from the counter value to indicate that the action corresponding to the counter value has been already taken, step 710, and generates an additional data read request to be sent to the input FIFO 320 on line 650, step 713. If the counter value is not equal to and/or greater than the positive value of the pre-determined output data bus width, then the request modifier circuitry 631 determines if the counter value is equal to and/or less than the negative value of the pre-determined output data bus width, step 711. If the counter value is equal to and/or less than the negative value of the pre-determined output data bus width then the request modifier circuitry 631 adds the positive value of the pre-determined output data bus width to the counter value to indicate that the action corresponding to the counter value has been already taken, step 712, and masks a data read requests sent on line 653 by not transmitting the modified data read request on line 650, step 714. Note that in the exemplary embodiment illustrated in FIG. 7 the pre-determined output data bus width of the packet processing system 200 is 16 bytes. Alternatively, in other embodiments other pre-determined output data bus widths may be used.

In the embodiment described in relation to FIG. 7, the framer engine 350 acts as the master device during the packet processing operation. It requests data at a pre-determined rate and expects a pre-determined amount of data for every request. The packets transferred from the link layer device 250 to the packet encapsulator 630 may not be packed and may be aligned to one side of the data bus. In one embodiment, the data may be aligned to a MSB of the data bus. In this embodiment, a SOP marker in the packet is aligned to the MSB. In an alternate embodiment, the SOP marker could be aligned to a LSB. The data may also be aligned using alternative methods known in the art.

In one exemplary embodiment of the packet processing system 200, the pre-determined output data bus width is 16-bytes and the packets being transferred may be 24-bytes wide. In this example, there are no insertions or deletions of data in the input data received by the packet encapsulator 630 from the link layer device 250. Alternatively, the link layer device 250 may send data that includes deleted and/or inserted data by link layer device 250. For each packet being processed, the counter value may skew to a positive value and additional data read requests may be generated by the request modifier circuitry 631. In response to the first request, the link layer device 250 transfers 16-bytes of the first packet. In response to the second request, the remaining 8-bytes of the packet are transferred and the counter value becomes +8. In response to the next two data read requests, this process repeats and the counter value becomes +16. The counter value of +16 triggers the generation of an additional data read request to the link layer device 250 because the counter value +16 is equal to the upper threshold value (e.g., positive value of the pre-determined output data bus width). The counter value is set again to zero (subtracting the pre-determined output data bus width of 16 from the counter value), as the additional data read request is generated by the request modifier circuitry 631. In this embodiment, for every 4 original data read requests from the framer engine 350, there may be an average of 5 data read requests generated and sent to the link layer device 250. The term average is used because there may be some computational delay between the data read request being generated by framer engine 350 and detecting that not enough input data has been received by the pre-compute circuitry 633 from the link layer device 250 for the pre-determined output data bus width and generating an additional data read request by the request modifier circuitry 631 to compensate for the deficiency in the bandwidth caused by the variation between the input and output data rates. In this exemplary embodiment, the utilization efficiency of the bandwidth of the packet processing system 200 may approach 100% efficiency.

In an alternate embodiment, the method may be used to increase the bandwidth of any processing system including a framer engine that acts as a master device for fetching data and expects data at a pre-determined data rate (for example, the data could be true data or idle cells), isolated packet inputs, and back-to-back packet outputs, and a processing device (e.g., such as a network processor) having spare (e.g., unused) bandwidth for processing additional data read requests.

In one embodiment for a SONET application, packets from the link layer device 250 may be encapsulated in the packet encapsulator 630 with a communication protocol, for example GFP or HDLC or ATM or another protocol, and then transported to the SONET device (physical interface device 260) as byte streams, one per channel. The SONET device may expect a pre-determined bandwidth to be maintained for each of the byte streams. The constant bandwidth may be maintained modifying the data read requests sent to the link layer device 250 and/or by adding idle cells that act as filler bytes or frames.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method, comprising:
calculating a variation between an input data rate and a pre-determined output data rate, the input data rate being based on a number of data read requests, wherein calculating the variation comprises updating a counter value representative of the variation, wherein calculating the variation further comprises:
determining a difference between a total bit group of data received from an input first-in-first-out (FIFO) and a pre-determined output data bus width; and
subtracting the difference from the counter value to update the counter value; and
compensating for the variation by modifying the number of data read requests, and wherein compensating for the variation comprises:
masking a data read request to be transmitted to the input FIFO when the counter value is either equal to or less than a lower threshold value, wherein the lower threshold value is one of the negative value or positive value of the pre determined output data bus width; and
generating an additional data read request to be transmitted to the input FIFO when the counter value is either equal to or greater than an upper threshold value, wherein the upper threshold value is the other one of the positive value or negative value of the pre-determined output data bus width.

2. The method of claim 1, wherein the variation is compensated to increase a bandwidth in a communication channel.

3. The method of claim 1, wherein the variation is compensated to increase the bandwidth in a plurality of communication channels.

4. The method of claim 1, wherein the variation is compensated to decrease a number of idle cell insertions.

5. The method of claim 1, wherein modifying the number of data read requests comprises generating a plurality of additional data read requests when the counter value is either equal to or greater than an upper threshold value.

6. The method of claim 1, wherein modifying the number of data read requests comprises masking a plurality of data read requests when the counter value is either equal to or less than a lower threshold value.

7. The method of claim 1, further comprising:
transmitting an output data stream to an output FIFO;
determining when the output FIFO is substantially full;
passing the data read requests to the input FIFO when the output FIFO is not substantially full; and
masking the data read request to the input FIFO when the output FIFO is substantially full.

8. The method of claim 7, wherein substantially full is a set value determined using a value representative of an amount of data contained in a number of stages of a pipeline subtracted from another value representative of a capacity of the output FIFO.

9. The method of claim 1, further comprising:
comparing a total bit group of data received by a packet encapsulator from the data read request with a counter value; and
performing at least one of said masking the data read request and said generating the additional data read request.

10. The method of claim 9, wherein the total bit group of data is a byte.

11. The method of claim 9, further comprising passing the data read request to the input FIFO.

12. The method of claim 9, further comprising passing the data read request and the additional data read request to the input FIFO.

13. An apparatus, comprising:
an input first-in-first-out (FIFO) to receive input data at an input data rate;
an encapsulator engine coupled to the input FIFO; and
a packet pre-processor coupled to the encapsulator engine and the input FIFO, wherein the packet pre-processor is configured to calculate a variation between the input data rate and a pre-determined output data rate and to update a counter value representative of the variation, the input data rate being based on a number of data read requests, wherein the packet pre-processor calculates the variation by determining a difference between a total bit group of data received from the input FIFO and a pre-determined output data bus width, and subtracting the difference from the counter value to update the counter value, wherein the packet pre-processor is configured to compensate for the variation by modifying the number of data read requests, including,
masking a data read request transmitted to the input FIFO when the counter value exceeds a first value of a predetermined range, wherein the first value is one of the negative value or positive value of the pre-determined output data bus width, and
generating an additional data read request transmitted to the input FIFO when the counter value exceeds a second value of the predetermined range, wherein the second value is the other one of the positive value or negative value of the pre-determined output data bus width.

14. The apparatus of claim 13, wherein the packet pre-processor comprises:
a pre-compute circuitry coupled to the input FIFO and the encapsulator engine, wherein the pre-compute circuitry is configured to calculate the total bit group of data received by the packet pre-processor at the input data rate; and
a request modifier circuitry coupled to the pre-compute circuitry and the input FIFO, wherein the request modifier circuitry is configured to determine the difference between the -total bit group of data calculated by the pre-compute circuitry and the pre-determined output data bus width.

15. The apparatus of claim 14, further comprising:
a link layer device coupled to the input FIFO; and
an output FIFO coupled to the encapsulator engine and the request modifier circuitry, wherein the output FIFO is configured to transmit output data at the pre-determined output data rate.

16. The apparatus of claim 15, further comprising:
a framer engine coupled to the output FIFO; and
a physical interface device coupled to the framer engine.

17. The apparatus of claim 16, wherein the pre-compute circuitry receives input data from the input FIFO, the encapsulator engine receives the input data from the pre-compute circuitry, the output FIFO receives the output data from the encapsulator engine, the request modifier circuitry receives data read requests from the framer engine, the link layer device receives the data read requests from the request modifier circuitry.

18. An apparatus, comprising:
means for transmitting data through a communication channel having a bandwidth;
an input first-in-first-out (FIFO) to receive input data from the communication channel at an input data rate;
means for determining a difference between a total bit group of data received from the input FIFO and a pre-determined output data bus width to calculate a variation between the input data rate and a pre-determined output data rate, the input data rate being based on a number of data read requests;
means for subtracting the difference from a counter value representative of the variation;
means for masking a data read request transmitted to the input FIFO when the variation exceeds a first threshold value of a pre-determined range to compensate for the variation to increase a utilization efficiency of the bandwidth, wherein the first threshold value is one of the negative value or positive value of the pre-determined output data bus width; and
means for generating an additional data read request transmitted to the input FIFO when the variation exceeds a second threshold value of the pre-determined range to compensate for the variation to increase the utilization efficiency of the bandwidth, wherein the second threshold value is the other one of the positive value or negative value of the pre-determined output data bus width.

19. The apparatus of claim 18, wherein the means for masking and the means for generating decreases a number of idle cell insertions.

20. The apparatus of claim 18, wherein the means for masking and the means for generating compensates for invalid bytes of an input data stream.

21. A system, comprising:
a link layer device;
a first physical interface device; and
a framer coupled to the link layer device and the first physical interface device, wherein the framer comprises an input first-in-first-out (FIFO), an encapsulator engine, and a packet pre-processor coupled to the encapsulator engine and the input FIFO, wherein the packet pre-processor is configured to calculate a variation between an input data rate and a pre-determined output data rate and to update a counter value representative of the variation, the input data rate being based on a number of data read requests, wherein the packet pre-processor calculates the variation by determining a difference between a total bit group of data received from the input FIFO and a pre-determined output data bus width, and subtracting the difference from the counter value to update the counter value, wherein the packet pre-processor is configured to compensate for the variation by modifying the number of data read requests, including,
masking a data read request transmitted to the input FIFO when the counter value exceeds a first value of a predetermined range; and
generating an additional data read request transmitted to the input FIFO when the counter value exceeds a second value of the predetermined range.

22. The system of claim 21, wherein the packet pre-processor comprises:
a pre-compute circuitry coupled to the input FIFO and the encapsulator engine, wherein the pre-compute circuitry is configured to calculate the total bit group of data received by the packet pre-processor at the input data rate; and
a request modifier circuitry coupled to the pre-compute circuitry and the input FIFO, wherein the request modifier circuitry is configured to determine the difference between the total bit group of data calculated by the pre-compute circuitry and the pre-determined output data bus width.

23. The system of claim 22, further comprising a second physical interface device coupled to the link layer device, wherein the second physical interface device, the link layer device, the framer and the first physical interface device reside in a line card.

24. The system of claim 23, wherein the second physical interface device is an Ethernet device and the first physical interface device is a Synchronous Optical Network (SONET) device.

25. The system of claim 23, wherein the line card is coupled to a wide area network (WAN).

26. A method, comprising:
calculating a variation between an input data rate and a pre-determined output data rate, the input data rate being based on a number of data read requests, wherein calculating the variation comprises updating a counter value representative of the variation, wherein calculating the variation further comprises:
determining a difference between a total bit group of data received from an input first-in-first-out (FIFO) and a pre-determined output data bus width; and
subtracting the difference from the counter value to update the counter value; and
compensating for the variation by modifying the number of data read requests, and wherein compensating for the variation comprises:
masking a data read request to be transmitted to the input FIFO when the counter value is either equal to or greater than an upper threshold value, wherein the upper threshold value is one of the positive value or negative value of the pre-determined output data bus width; and
generating an additional data read request to be transmitted to the input FIFO when the counter value is either equal to or less than a lower threshold value, wherein the lower threshold value is the other one of the negative value or positive value of the pre-determined output data bus width.

* * * * *